United States Patent [19]
Park

[11] Patent Number: 6,016,719
[45] Date of Patent: Jan. 25, 2000

[54] CONTINUOUSLY VARIABLE RECIPROCATING TRANSMISSION DEVICE

[76] Inventor: Bret J. Park, 9176 S. Tortellini Dr., Sandy, Utah 84093

[21] Appl. No.: 08/828,802

[22] Filed: Mar. 27, 1997

[51] Int. Cl.$^7$ .................................................. F16L 3/04
[52] U.S. Cl. ............................... 74/601; 74/837; 74/600; 74/55
[58] Field of Search .................. 74/520, 117, 119, 74/121, 123, 586, 44, 600, 601, 602, 837; 403/43

[56] References Cited

U.S. PATENT DOCUMENTS

| | | |
|---|---|---|
| 286,596 | 10/1883 | Ercanbrack . |
| 347,539 | 8/1886 | Waterman ................................. 74/600 |
| 403,637 | 5/1889 | Bomm . |
| 1,050,226 | 1/1913 | Nixon . |
| 1,063,839 | 6/1913 | Smith . |
| 1,183,380 | 5/1916 | Holdt . |
| 1,301,982 | 4/1919 | Smith . |
| 1,378,621 | 5/1921 | Sabin ........................................ 74/601 |
| 1,489,014 | 4/1924 | Shellenberger . |
| 1,858,934 | 5/1932 | Neurath . |
| 1,909,831 | 5/1933 | Jensen . |
| 2,782,647 | 2/1957 | Wildhaber ................................ 74/600 |
| 2,841,997 | 7/1958 | Maust ....................................... 74/119 |
| 2,856,793 | 10/1958 | Budlong ................................... 74/600 |
| 3,321,984 | 5/1967 | Nittka ...................................... 74/117 |
| 4,739,667 | 4/1988 | Peterson . |
| 5,297,448 | 3/1994 | Galvin ....................................... 74/55 |
| 5,392,664 | 2/1995 | Gogins . |

*Primary Examiner*—Tamara Graysay
*Assistant Examiner*—Marcus Charles
*Attorney, Agent, or Firm*—Clayton, Howarth & Cannon, P.C.

[57] ABSTRACT

A variable-ratio transmission device. A first translational member is pivotally intercoupled to a first rotational member by at least one connecting arm. The connecting arm has a first portion pivotally connected to the first translational member at a first pivot point, and a second portion pivotally and adjustably connected to the first rotational member at a first radial attachment point removed from the center of rotation of the first rotational member. The first radial attachment point and the center of rotation thereby define a first attachment radius. The location of the first radial attachment point with respect to the first rotational member is variable to thereby increase and decrease the first attachment radius, which in turn modifies a ratio of movement between the first rotational member and the first translational member.

16 Claims, 3 Drawing Sheets

CONTINUOUSLY VARIABLE RECIPROCATING TRANSMISSION DEVICE

BACKGROUND OF THE INVENTION

1. The Field of the Invention

The present invention relates generally to vehicle transmissions. More particularly, it concerns a variable-ratio transmission device.

2. The Background Art

Transmission devices are well known in the field of motorized vehicles for converting and transmitting the force generated by an engine to an output shaft. It is known to make efficient use of the motor power by adjusting the gear ratio between the input and output shafts responsive to variation in loads on the output shaft, or on the input shaft. For example, a higher gear ratio often provides a more efficient transfer of force for larger loads on the output shaft. Conversely, a lower gear ratio often suffices for lesser loads on the output shaft.

The need to optimize the motor power by varying the gear ratio has motivated the development of many different transmission devices capable of shifting between gear ratios. The standard transmission is known in the field to permit an operator to shift between various gear ratios by operating a hand-shift lever in conjunction with a foot clutch. Automatic transmissions have been developed which accomplish an automatic shifting between gear ratios responsive to increases and decreases in load on the output shaft.

Another approach to vehicle transmissions is the concept of a continuously variable transmission, which automakers have attempted for years to develop. It is thought that energy transfer between the motor and the output shaft can be further optimized by providing an infinite range of gear ratios between the minimum and maximum gear ratios, instead of merely four or five different gear ratios. This idea is a good one, since variation in load on the output shaft tends to increase and decrease gradually and continuously. Indeed, it stands to reason that provision of an optimal gear ratio for each and every load variation on the output shaft would maximize the efficiency of the vehicle. However, there have been many practical difficulties with the prior art transmission devices which offer continuously variable gear ratios.

There is thus a need for a variable-ratio transmission which is simple in design, manufacture and operation.

OBJECTS AND SUMMARY OF THE INVENTION

It is therefore an object of the present invention to provide a variable-ratio transmission which is simple is design and operation.

It is another object of the invention, in accordance with one aspect thereof, to provide such a transmission capable of converting rotational motion to reciprocating, linear motion at variable ratios.

It is a further object of the invention, in accordance with one aspect thereof, to provide such a transmission capable of varying a ratio of movement between gear members during movement of said gear members.

The above objects and others not specifically recited are realized in a specific illustrative embodiment of a variable-ratio transmission device. A first translational member is pivotally intercoupled to a first rotational member by at least one connecting arm. The output member could be a gear, a piston, or any other suitable output member. The connecting arm has a first portion pivotally connected to the first translational member at a first pivot point, and a second portion pivotally and adjustably connected to the first rotational member at a first radial attachment point removed from the center of rotation of the first rotational member. The first radial attachment point and the center of rotation thereby define a first attachment radius. The location of the first radial attachment point with respect to the first rotational member is variable to thereby increase and decrease the first attachment radius, which in turn modifies a ratio of movement between the first rotational member and the first translational member.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF PRESENTLY PREFERRED EMBODIMENTS

Figure 1:
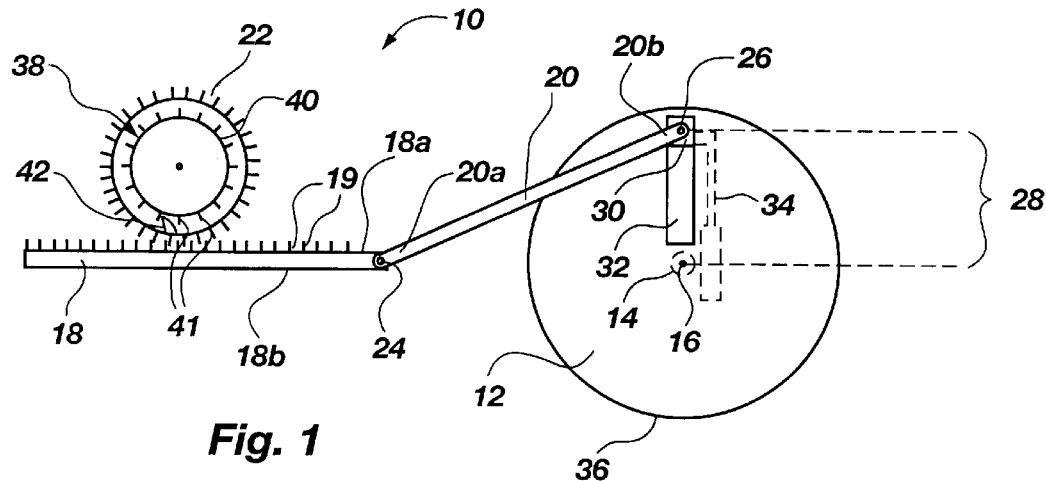
FIG. 1 is a side, schematic view of a variable-ratio transmission, made in accordance with the principles of the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the illustrated apparatus, and any additional applications of the principles of the invention as illustrated herein, which would normally occur to one skilled in the relevant art and possessed of this disclosure, are to be considered within the scope of the invention claimed.

Applicant has discovered a new design for a variable-ratio transmission device capable of transmitting force while varying gear ratios during movement of the gears. In FIG. 1 is shown a transmission device, designated generally at 10. The transmission 10 includes a first rotational member 12, configured for attachment to a means 14, which could be an input shaft, for rotating said first rotational member 12 about a center of rotation 16. Of course, any suitable means known in the art for rotating the first rotational member 12 could be used, including belts or gears. A first translational member 18 is intercoupled to the first rotational member 12 by a connecting arm 20, and is configured for transmitting force to an output gear 22 that is disposed in meshing engagement with said first translational member 18.

Figure 2:
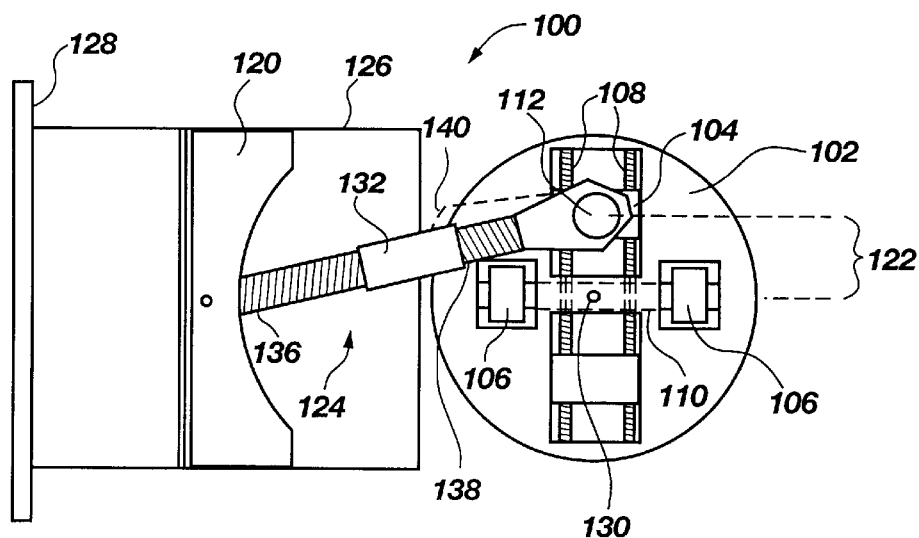
FIG. 2 is a side, schematic view of an alternative embodiment of the variable-ratio transmission of FIG. 1.

In operation, an input force operates to rotate the first rotational member 12, which causes translational output movement in the first translational member 18. Alternatively, an input force may instead be applied to the translational member 18 to cause rotational output movement in the first rotational member 12, as illustrated in FIG. 2, and explained below in more detail. It is further to be understood that the first rotational member 12 may comprise a crank arm instead of a disc-like member, or any other suitable rotational member.

The connecting arm 20 has a first portion 20a pivotally connected to the first translational member 18 at a first pivot point 24, and a second portion 20b pivotally and adjustably connected to the first rotational member 12 at a first radial attachment point 26 removed from the center of rotation 16 of the first rotational member 12. The first radial attachment point 26 and the center of rotation 16 thereby define a first attachment radius 28. The location of the first radial attachment point 26 with respect to the first rotational member 12 is variable to thereby increase and decrease the first attachment radius 28, which in turn modifies a ratio of movement between the first rotational member 12 and the first translational member 18.

The ratio of movement between the first rotational member 12 and the translation member 18 is a gear ratio that can be varied by moving the first radial attachment point 26 toward and away from the center of rotation 16 of the first rotational member 12.

Any suitable adjusting means may be used for varying a location of the first radial attachment point 26 with respect to the first rotational member 12 to thereby increase and decrease the first attachment radius 28. For example the adjusting means may include a moveable portion 30 slidably disposed within a slot 32, with the second portion 20b of the connecting arm 20 being pivotally connected to said moveable portion 30, and a moving means 34 for moving said moveable portion 30 within the slot 32. The moving means 34 could comprise a suitable hydraulic cylinder, for example. The adjusting means is preferably designed to vary the location of the first radial attachment point 26 during rotation of the first rotational member 12, in accordance with any suitable method or design known to those of ordinary skill in the relevant art.

It is thus appreciated that movement of the first translational member 18 and movement of the first rotational member 12 define a first ratio of movement of said first rotational member 12 to said first translational member 18. The adjusting means described above may constitute a means for varying the location of the first radial attachment point 26, without varying a location of the first pivot point 24 relative to the first translational member 18, to thereby change the first ratio of movement to a second ratio of movement.

The adjusting means thus comprises a means for continuously varying the location of the first radial attachment point 26 to thereby continuously vary a first ratio of movement of the first rotational member 12 to the first translational member 18. The translational member 18 preferably comprises an elongate rack gear having gear teeth 19 arranged in a substantial linear orientation. More preferably, the rack gear 18 comprises a first side 18a and an opposing second side 18b, and wherein the gear teeth 19 extend outwardly from the first side 18a such that the second side 18b is characterized by an absence of gear teeth.

The first rotational member 12 further includes a perimeter 36 defining an interior area. Preferably, less than a majority of the interior area defined by the perimeter 36 comprises an opening. For example, in FIG. 1 the slot 32 could be the only opening in the rotational member 12, and it constitutes less than a majority of the interior area defined by the perimeter 36.

The output gear 22 constitutes a rotational member. The transmission 10 may further include unidirectional clutch means 38 for (i) engaging the output gear 22 in rotational movement when the first rotational member 12 rotates in a first rotational direction and (ii) releasing the output gear 22 from engagement in rotational movement when said first rotational member 12 rotates in a second, opposing rotational direction.

The unidirectional clutch means 38 may be designed in any suitable manner, and is depicted schematically in FIG. 1 as an inner gear 40 concentrically disposed within the output gear 22. The inner gear 40 is rotatably disposed with respect to the output gear 22, and a clutch piece 42 is coupled to an inner portion of the output gear 22. Inspection of FIG. 1 illustrates that rotational movement of the first rotational member 12 causes a reciprocating, linear back-and-forth movement of the first translational member 18, which in turn causes a reciprocating rotational movement of the output gear 22. The clutch piece 42 is designed and positioned such that when the output gear 22 rotates clockwise, the clutch piece engages against one of gear teeth 41 of the inner gear 40 to cause rotational movement of the inner gear 40 in tandem with the output gear 22. Conversely, when the output gear 22 rotates counterclockwise, the clutch piece 42 passes over the gear teeth 41, thereby releasing inner gear 40 from engagement in rotational movement in tandem with the output gear 22.

Figure 3:
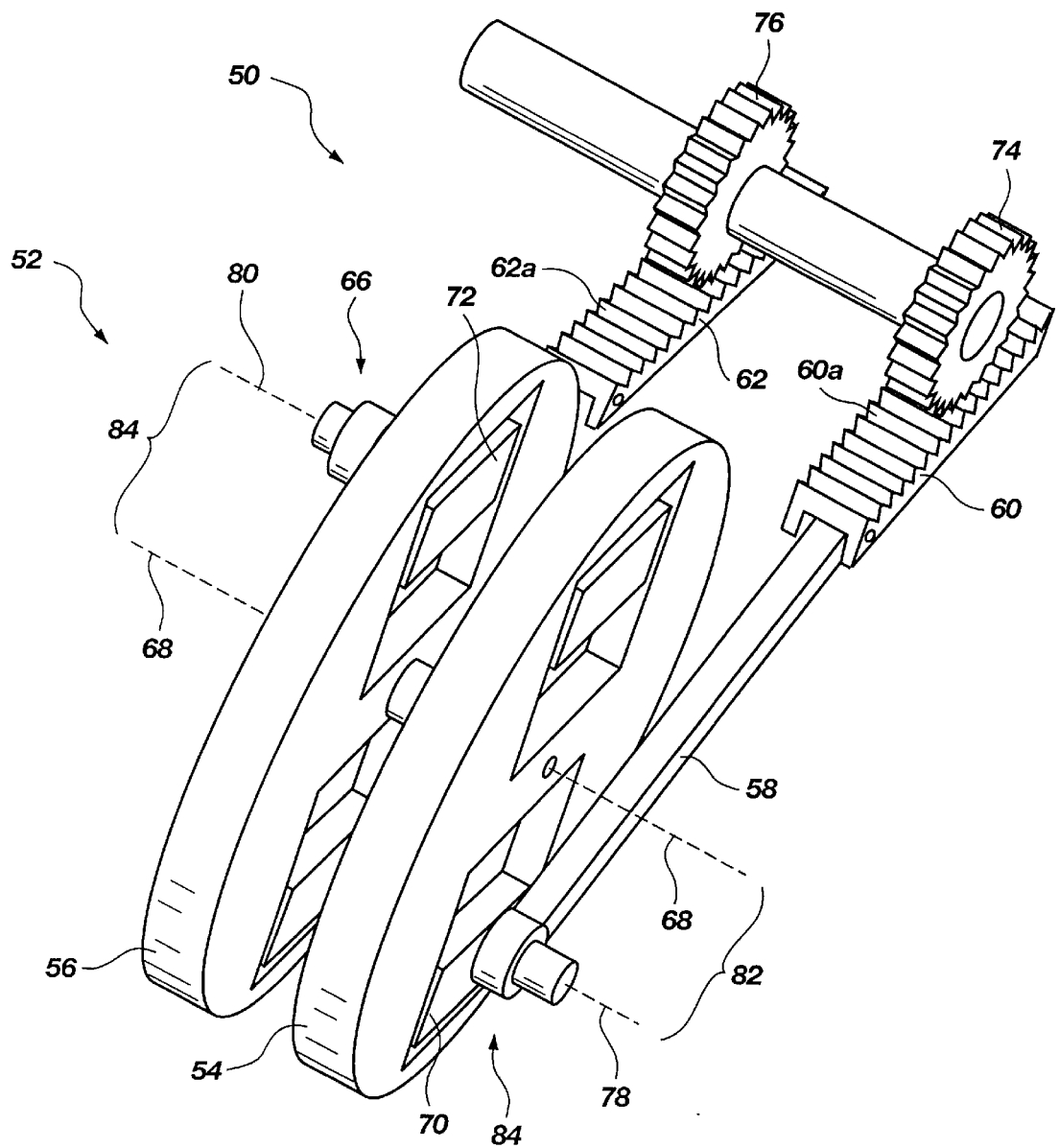
FIG. 3 is a perspective view of an alternative embodiment of the variable-ratio transmission of FIG. 1.

In FIG. 3 is shown an alternative embodiment of a transmission, designated generally at 50. A principal aspect of the transmission 50 of FIG. 3, as distinguished from the transmission 10 of FIG. 1, is the additional of one or more rotational members. The transmission 50 of FIG. 3 depicts two fixedly attached rotational members 54 and 56, with corresponding connecting arms and translational members 60 and 62. It is to be understood that an suitable number of rotational members and corresponding connecting arms and translational members may be interconnected in the manner of FIG. 3.

Accordingly, the transmission 50 of FIG. 3 may be described as having two rotational members 54 and 56. Alternatively, this structural arrangement could be described as a first rotational member designated generally at 52 having a first side 54 and an opposing second side 56. A first connecting arm 58 is pivotally connected to the first side 54 and to a first translational member 60. A second connecting arm (residing behind the second side 56, and therefore not shown) is preferably identical to the first connecting arm 58 and includes a first portion pivotally connected to the second translational member 62 and a second portion pivotally connected to the second side 56 of the first rotational member 52. The first and second translation members 60 and 62 include gear teeth 60a and 62a disposed in meshing engagement with first and second output gears 74 and 76, respectively.

The transmission 50 could thus be described as two of the transmission 10 of FIG. 1, connected together. The first connecting arm 58 is pivotally attached at a first radial attachment point 64, and the second connecting arm (not shown in FIG. 3 because it resides behind the second side 56 in that view) is pivotally attached at a second radial attachment point 66. Both radial attachment points 64 and 66 are removed from the center of rotation 68 of the first rotational member 52, such that said first and second radial attachment points 64 and 66 define a first and a second attachment radius, respectively, with the center of rotation 68.

The radial attachment points 64 and 66 are preferably disposed on moveable portions 70 and 72, respectively. Movement of the portions 70 and 72 operate to vary a location of the first and second radial attachment points 64 and 66 to thereby increase and decrease the first and second attachment radii, respectively. For example, the moveable portions 70 and 72 may be designed and operable similar to the workings of the transmission depicted in FIG. 2, as explained below in more detail.

The first and second output gears 74 and 76 constitute a second rotational member and a third rotational member, respectively, by reference to the first rotational member 52. The transmission 50 may further comprise unidirectional clutch means identical in structure and operation to the unidirectional clutch means 38 of FIG. 1, for (i) engaging the first output gear 74 in rotational movement when the first rotational member 52 rotates in a first rotational direction and (ii) releasing the first output gear 74 from engagement with the first rotational member 52 when said first rotational member 52 rotates in a second, opposing rotational direction, and (iii) engaging the second output gear 76 in rotational movement when the first rotational member 52 rotates in the second, opposing rotational direction and (iv) releasing the second output gear 76 from engagement with the first rotational member 52 when said first rotational member 52 rotates in the first rotational direction.

It will be appreciated that the first and second radial attachment points 64 and 66 may be diametrically positioned to cause the first and second translational members 60 and 62 to move in opposing directions. Further, the first and second radial attachment points 64 and 66 define a first pivot axis 78 and a second pivot axis 80, respectively, and the center of rotation 68 of the first rotational member 52 defines a center axis.

Positioning of the first pivot axis 78, second pivot axis 80 and center axis 68 is such that the first pivot axis 78 and the second pivot axis 80 are offset from the center axis 68 by a first and second radial distance 82 and 84, respectively, and such that a first line connecting the first pivot axis 78 with the center axis 68 and a second line connecting the second pivot axis 80 with the center axis 68 preferably define an approximately 180° angle about said center axis 68, such that said positioning cooperates with the unidirectional clutch means to cause reciprocating, back-and-forth rotational movement of the first output gear 74 and reciprocating, back-and-forth rotational movement of the second output gear 76 opposite in direction to the rotational movement of the first output gear 74. Preferably, an adjusting means would include the moveable pieces 70 and 72 and would be designed to maintain the first radial distance 82 substantially equivalent to the second radial distance 84.

Figure 2B:
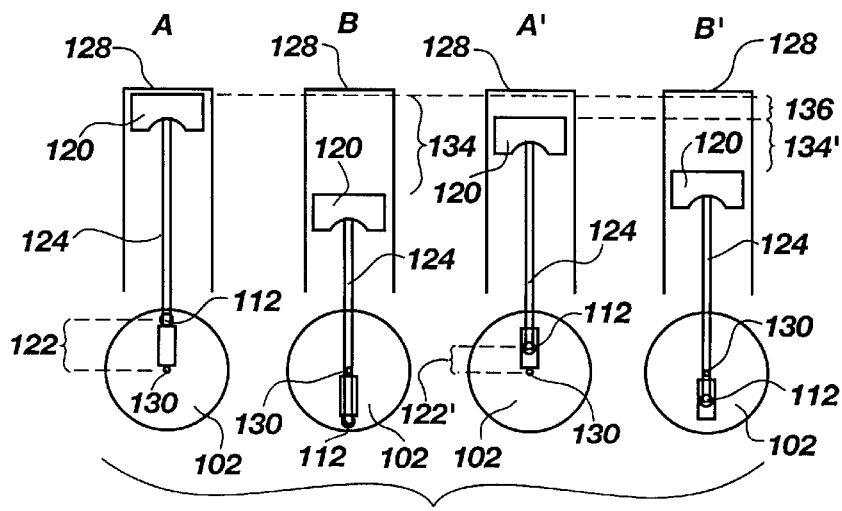
FIG. 2B is a side, schematic view showing two movement stages in the transmission of FIG. 2 having a first radius of attachment, and in the same transmission but having a second radius of attachment.
Figure 2A:
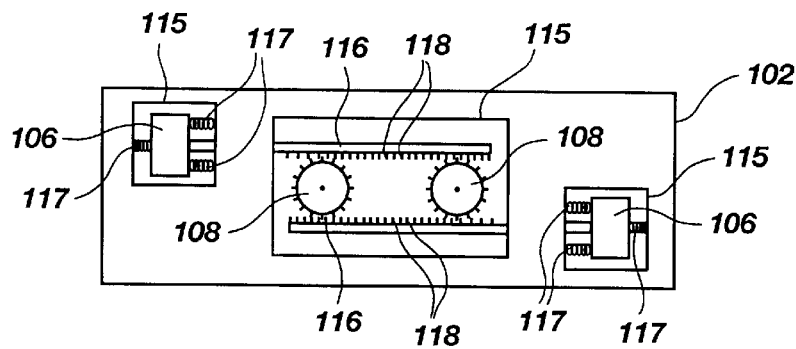
FIG. 2A is a plan, schematic view of a first rotational member of the transmission of FIG. 2.

Referring now to FIG. 2, there is shown a further embodiment of a transmission, designated generally at 100, and a more detailed view of a first rotational member 102 thereof is illustrated in FIG. 2A. Openings 115 in the first rotational member 102 are provided solely to illustrate some interior features purposes, and it is contemplated that such openings 115 would not exist in a working embodiment.

The transmission 100 embodies an adjusting means that may also be utilized in conjunction with the transmission 10 of FIG. 1, or with the transmission 50 of FIG. 3, or with any suitable embodiment of a transmission device. The first rotational member 102 includes a movement piece 104 having one or more female-threaded throughpassages formed therein. The adjusting means includes a mass means 106 movably disposed on the first rotational member 102 for moving radially outwardly and inwardly along said first rotational member 102. Male-threaded members 108 are rotatably disposed on the first rotational member 102 and extend through the female-threaded throughpassages of the movement piece 104 in threaded engagement therewith.

An actuating means 110 is provided for rotating the male-threaded members 108 responsive to radially-directed movement of the mass means 106 along the first rotational member 102, to thereby cause dynamic thread-to-thread engagement of said male-threaded members 108 with female threads of the female-threaded throughpassages of the movement piece 104 sufficient to cause radially-directed movement of the movement pieces 108 along the first rotational member 102, which causes variation in the location of a first radial attachment point 112 with respect to the first rotational member 102.

The actuating means 110 includes gear teeth 114 (FIG. 2A) formed on the male-threaded members 108. Gear bodies 116 are coupled to the mass means 106 and extend outwardly therefrom. The gear body 116 has gear teeth 118 disposed in meshing engagement with the gear teeth 114 on the male-threaded members 108. In accordance with one aspect of the invention, mass means 106 are slidably disposed in any suitable manner on, or within, the first rotational member 102. As the first rotational member 102 rotates, centrifugal force operates to drive the mass means 106 radially outwardly, thereby pulling the gear bodies 116 and rotating the male-threaded members 108 through meshing engagement between the gear teeth 114 and 118. The rotation of the male-threaded members 108 operates to move the moveable piece 104 through threaded engagement.

It will be appreciated that a spring force is preferably imposed upon the mass means 106, which operates as a kind of force cushion against movement of the mass means 106. As shown in FIG. 2A, spring means 117 are applied to opposing sides of each mass means 106. As centrifugal force is applied to the mass means 106, they are thereby driven radially outwardly against the force of the spring means 117. The spring means 117 may comprise any suitable spring force means, including mechanical springs, gas springs, or otherwise.

The actuating means 110 is designed such that (i) the faster the rotational velocity, the more the centrifugal force and the farther the mass means 106 are driven radially outwardly, and conversely (ii) the slower the rotational velocity, the less the centrifugal force, and the less radially outwardly the mass means 106 are driven.

It is thus contemplated that the first rotational member 102 might be disposed in a constant rotational velocity, at which time the mass means 106 would be thrust radially outwardly to a certain point of equilibrium. If the rotational velocity of the first rotational member 102 increases, the mass means 106 would be driven even further outwardly, while a decrease in rotational velocity would cause a radially inward retreat of the mass means 106.

As the mass means 106 are driven outwardly, corresponding movement in the gear bodies 116 operates to rotate the male-threaded members 108, thereby moving radially outwardly the moveable piece 104 because of threaded engagement between the male-threaded members 108 and the moveable piece 104. As rotational velocity increases, so does a radius of attachment 122, which causes the ratio of movement of the first rotational member 102 to a translational member 120 to increase. As rotational velocity decreases, the radius of attachment 122 also decreases, as does the ratio of movement.

Referring now to FIGS. 2 and 2B, the transmission 100 further comprises lengthening means 132 for varying a length of connecting arm 124. The transmission 100 may comprise a piston system in an engine, for example. The translational member 120 would be a piston slidably disposed within an engine cylinder 126, wherein the piston 120 is disposed in reciprocating motion toward and away from an engine head 128.

The engine head 128 constitutes a reference member that resides in a substantially fixed location with respect to a center 130 of the first rotational member 102, which operates as a first force-transmitting member. The piston 120 is a translational-moving member that operates as a second force-transmitting member, and is confined to a cycle of reciprocating linear movement toward and away from the engine had 128 responsive to rotational movement of the first, rotational force-transmitting member 102.

The cycle of reciprocating linear movement is defined between a distal position and a proximal position of the piston 120. FIG. 2B illustrates a distal position of the piston 120 in part A, and a corresponding proximal position is part B. The distance 134 between the distal and proximal positions of the piston 120 is a stroke length. It will be appreciated that radial displacement of the first radial attachment point 26 will modify the stroke length 134.

As the radius of attachment 122 decreases to 122', so too does the stroke length 134 decrease to 134'. For example, part A' of FIG. 2B illustrates a distal position of the piston 120 when the radius of attachment 122 has been decreased, and a corresponding proximal position is illustrated in part B'. As shown, the stroke length has decreased to 134' with the decrease to the radius of attachment 122'.

It is known in the field of engines to design the workings of the engine pistons such that piston movement terminates in a distal-most position at "top dead center" as that phrase is known in the art. The piston head position of "top dead center" is shown in part A of FIG. 2B, and is a terminal movement position at which movement of piston 120 reaches a temporary point of zero velocity. It will be appreceiated that the top dead center position can be adjusted with respect, to the engine head 128 to maintain optimal engine performance. One challenge in the operation of the transmission 100, therefore, is the fact that a decreased radius of attachment 122' produces a displacement of the top dead center position of piston 120 away from the engine head 128.

Accordingly, the adjusting means further comprises any suitable means 132 for varying the length of the connecting arm 124 sufficient to maintain the distal position (part A) of the cycle of reciprocating linear movement in substantially the same location with respect to the engine head 128. The means 132 comprises a female-threaded sleeve which threadably engages with, and thereby intercouples together, male-threaded portions 136 and 138 of the connecting arm 124. A lengthening device 140 is represented schematically in FIG. 2, and may comprise any suitable means for rotating the sleeve 132 responsive to movement of the moveable piece 104 relative to the first rotational member 102, to (i) increase the length of the connecting arm 124 when the radius of attachment 122 decreases, or (ii) decrease the length of the connecting arm 124 when the radius of attachment 122 increases, to thereby maintain the distal-most position of piston 120 at the "top dead center" position, or at any other consistent position desired.

The engine head 128 thus resides in a substantially fixed location with respect to the center 130 of the first rotational, force-transmitting member 102. The piston 120 comprises a first translational member confined to a cycle of reciprocating linear movement toward and away from the engine head 128 responsive to rotational movement of the first, rotational force-transmitting member 120. The adjusting means in the form of sleeve 132 and lengthening device 140 comprise means for varying the length of the connecting arm 124 sufficient to maintain the distal position of the cycle of reciprocating linear movement in substantially the same location with respect to the engine head 128.

In accordance with the principles of the present invention, one preferred method for transmitting force among gear members and varying a gear ratio of movement said gear members comprises the steps of:

(a) pivotally connecting a first portion of a connecting arm to a first translational member at a first pivot point, and pivotally connecting a second portion of the connecting arm to a first rotational member at a first radial attachment point removed from a center of rotation of the first rotational member such that said first radial attachment point and said center of rotation define a first attachment radius, such that dynamic force from rotational movement of the first rotational member is transmitted by the connecting arm to the first translational member; and (b) varying a location of the first radial attachment point with respect to the first rotational member to thereby increase and decrease the first attachment radius and change a first ratio of movement of said first rotational member to the first translational member.

Figure 4:
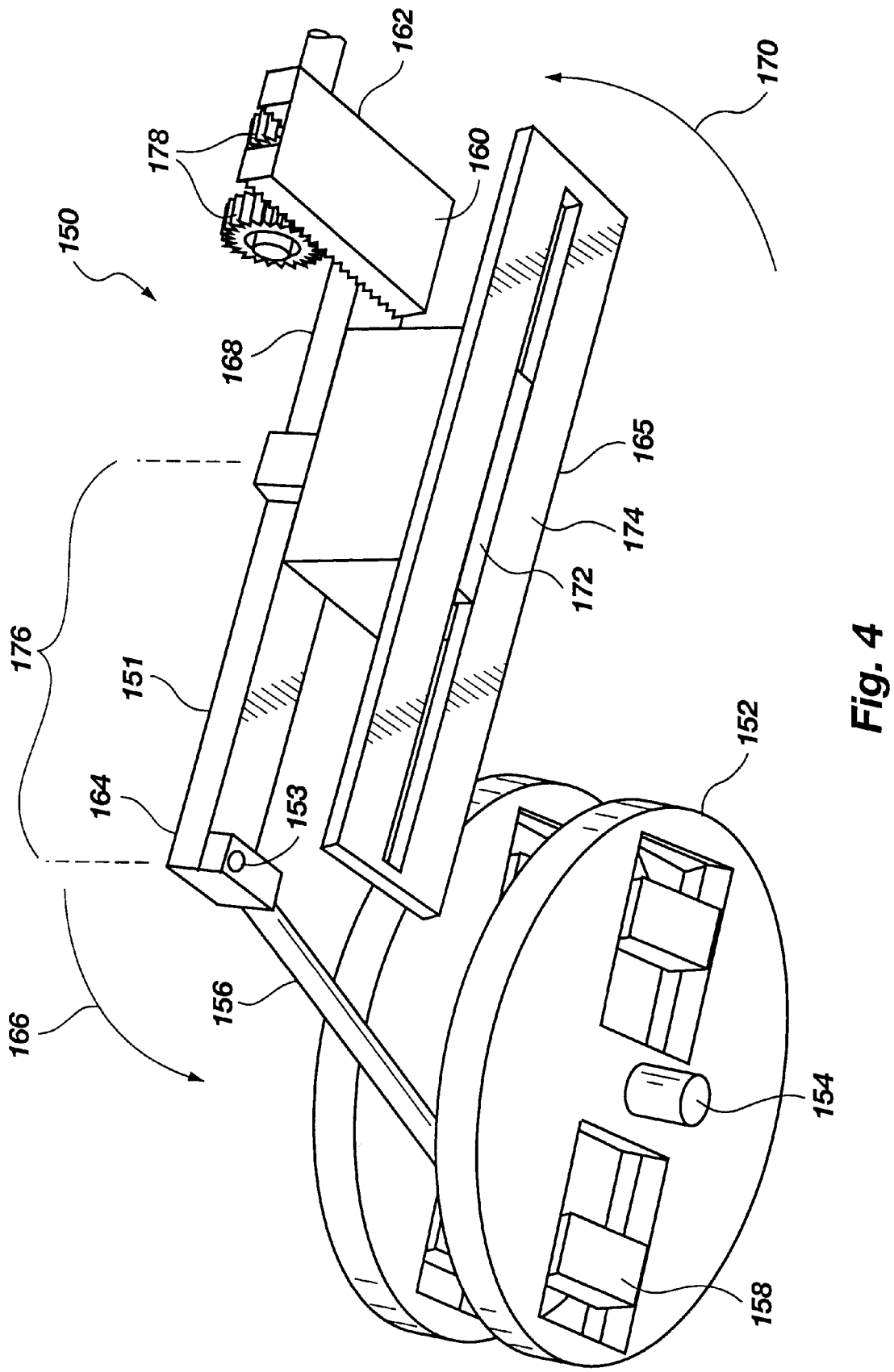
FIG. 4 is a perspective view of a further alternative embodiment of the variable-ratio transmission of FIG. 1.

Referring now to FIG. 4, there is shown a further alternative embodiment of a transmission device, designated generally at 150, which includes a first rotational member 152 having a center of rotation 154. The transmission 150 differs from that of FIGS. 1–3 by provision of a second connecting arm 151. The second connecting arm 151 is pivotally connected at 153 to a first connecting arm 156, which is in turn pivotally connected to a movement piece 158 at a radial attachment point. Movement of the movement piece 158 may be accomplished in any suitable manner, preferably in the manner described in conjunction with item 30 of FIG. 1, or item 104 of FIG. 2.

The second connecting arm 151 is slidably attached at item 160 to a first translational member 162, and an interior portion 165 of the second connecting arm 151 is pivotally attached to a fulcrum point 172. In this manner, movement of a first portion 164 of the second connecting arm 151 in a first direction 166 causes corresponding movement of a second portion 166 of said second connecting arm 151 in a second, opposing direction 170.

It will be appreciated that the second connecting arm 151 is an elongate member defining an axial direction, and that the fulcrum concept may include a means 174 for moving the fulcrum point 172 along the axial direction of the second connecting arm 151 to thereby modify a range of movement of said second connecting arm. A radius of influence 176 is defined between the fulcrum point 172 and the pivot connection 153 between the first and second connecting arms 156 and 151. For example, if the fulcrum point 172 is moved so as to decrease the radius of influence 176, the range of movement of the second portion 168 increases, and vice versa. The means 174 for moving the fulcrum point 172 may be designed and operated in any suitable manner.

It may thus be understood that the range of movement of the second portion 168 of the second connecting arm 151 may be influenced solely by manipulation of the fulcrum point 172, and the movement piece 158 may therefore remain intact in a relatively fixed position. Of course, the movement piece 158 may also be moved to increase and decrease the radius of attachment for further modification of the position and range of movement of the second connecting arm 151, and thus the first translational member 162. The first translational member 162 may engage gear members 178 as shown, or may alternatively be designed in the manner of a piston, such as piston 120 of FIG. 2.

In accordance with the above, the first connecting arm 20 of FIG. 1, as well as the first and second connecting arms 156 and 151 and fulcrum point 172 of FIG. 4, may both be described as a connecting means for operatively connecting the first rotational member and the first translational member such that movement of one of said translational member and rotational member causes movement of the other of said translational member and rotational member, wherein the connecting means comprises a first connecting arm having a first portion, and a second portion pivotally connected to the first rotational member, and a second connecting arm having a first portion pivotally connecting to the first portion of the first connecting arm, and an opposing second portion slidably connected to the first translational member.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A transmission device comprising:
   a first rotational member configured for attachment to a means for rotating said first rotational member about a center of rotation;
   a first translational member configured for transmitting force to a means for using said force;
   connecting means for operatively connecting the first rotational member and the first translational member such that movement of one of said translational member and rotational member causes movement of the other of said translational member and rotational member, wherein a portion of the connecting means is pivotally connected to the first rotational member at a first radial attachment point removed from the center of rotation of said first rotational member such that said first radial attachment point and said center of rotation define a first attachment radius; and
   adjusting means for varying a location of the first radial attachment point responsive to rotational speed of the first rotational member to thereby increase and decrease the first attachment radius.

2. The transmission device of claim 1, wherein the adjusting means further comprises means for varying the location of the first radial attachment point during rotation of the first rotational member.

3. The transmission device of claim 1, wherein the first rotational member includes a moveable portion, and wherein the connecting means is pivotally connected to said moveable portion, and wherein the adjusting means further comprises means for moving said moveable portion.

4. The transmission device of claim 1, wherein the first rotational member includes a perimeter defining an interior area, and wherein less than a majority of said interior area comprises an opening.

5. A transmission device comprising:
   a first rotational member configured for attachment to a means for rotating said first rotational member about a center of rotation;
   a first translational member configured for transmitting force to a means for using said force;
   connecting means for operatively connecting the first rotational member and the first translational member such that movement of one of said translational member and rotational member causes movement of the other of said translational member and rotational member, wherein a portion of the connecting means is pivotally connected to the first rotational member at a first radial attachment point removed from the center of rotation of said first rotational member such that said first radial attachment point and said center of rotation define a first attachment radius; and
   adjusting means for varying a location of the first radial attachment point with respect to the first rotational member to thereby increase and decrease the first attachment radius;
   wherein the first rotational member includes a movement piece having a female-threaded throughpassage formed therein, wherein the adjusting means further comprises:
      mass means movably disposed on the first rotational member for moving radially outwardly and inwardly along said first rotational member;
      at least one male-threaded member rotatably disposed on the first rotational member and extending through the throughpassage of the movement piece in threaded engagement therewith; and
      actuating means for rotating the male-threaded member responsive to radially-directed movement of the mass means along the first rotational member to thereby cause dynamic thread-to-thread engagement of said male-threaded member with female threads of the female-threaded throughpassage sufficient to cause radially-directed movement of the movement piece along the first rotational member, and thus variation in the location of the first radial attachment point with respect to the first rotational member.

6. The transmission device of claim 5, wherein the actuating means comprises:
   gear teeth formed on the male-threaded member; and
   a gear body coupled to the mass means and extending outwardly therefrom, said gear body having gear teeth disposed in meshing engagement with the gear teeth on the male-threaded member.

7. The transmission device of claim 1, wherein movement of the first translational member and movement of the first rotational member define a first ratio of movement of said first rotational member to said first translational member, and wherein the adjusting means further comprises means for varying the location of the first radial attachment point without varying a location of the first pivot point relative to the first translational member to thereby change the first ratio of movement to a second ratio of movement.

8. The transmission device of claim 1, wherein the adjusting means further comprises means for continuously varying the location of the first radial attachment point to thereby continuously vary a first ratio of movement of the first rotational member to the first translational member.

9. The transmission device of claim 1, further comprising lengthening means for varying a length of the connecting means.

10. The transmission device of claim 9:

wherein a reference member resides in a substantially fixed location with respect to a center of the first rotational force-transmitting member;

wherein the second force-transmitting member comprises a- first translational member confined to a cycle of reciprocating linear movement toward and away from the reference member responsive to rotational movement of the first, rotational force-transmitting member, wherein the cycle of reciprocating linear movement is defined between a distal position and a proximal position of said first translational member;

wherein the adjusting means further comprises means for varying the length of the connecting means sufficient to maintain the distal position of the cycle of reciprocating linear movement in substantially the same location with respect to the reference member.

11. The transmission device of claim 10, wherein the connecting means and the lengthening means collectively comprise a male-threaded cylindrical member threadably engaged within a female-threaded sleeve, said male-threaded cylindrical member having a longitudinal axis and being rotatable with respect to the female-threaded sleeve about said longitudinal axis.

12. The transmission device of claim 1, further comprising an engine cylinder, wherein the first translational member comprises a piston member slidably disposed within the engine cylinder.

13. The transmission device of claim 1, wherein the connecting means comprises a first connecting arm having a first portion pivotally connected to the first translational member at a first pivot point, and a second portion pivotally connected to the first rotational member at a first radial attachment point removed from the center of rotation of said first rotational member such that said first radial attachment point and said center of rotation define a first attachment radius.

14. A transmission device comprising:

a first, rotational, force-transmitting member configured for attachment to a means for rotating said first rotational member;

mass means movably disposed on the first rotational member for moving radially outwardly and inwardly along said first rotational member responsive to increases and decreases in rotational velocity, respectively, of said first rotational member;

a second force-transmitting member;

connected to the first, rotational force-transmitting member; and connecting means for (i) connecting the first, rotational force-transmitting member to the second force-transmitting member in a manner sufficient to cause said second force-transmitting member to engage in movement responsive to movement of said first, rotational force-transmitting member at a first ratio of movement of said first, rotational force-transmitting member to said second force transmitting member, and (ii) changing the first ratio of movement to a second ratio of movement responsive to movement of the mass means along the first, rotational force-transmitting means.

15. The transmission device of claim 14, wherein the first rotational member includes a movement piece having a female-threaded throughpassage formed therein, wherein the adjusting means further comprises:

at least one male-threaded member rotatably disposed on the first rotational member and extending through the throughpassage of the movement piece in threaded engagement therewith;

actuating means for rotating the male-threaded member responsive to radially-directed movement of the mass means along the first rotational member to thereby cause dynamic thread-to-thread engagement of said male-threaded member with female threads of the female-threaded throughpassage sufficient to cause radially-directed movement of the movement piece along the first rotational member, and thus variation in the location of the first radial attachment with respect to the first rotational member.

16. The transmission device of claim 15, wherein the actuating means comprises:

gear teeth formed on the male-threaded member; and a gear body coupled to the mass means and extending outwardly therefrom, said gear body having gear teeth disposed in meshing engagement with the gear teeth on the male-threaded member.

* * * * *